(12) United States Patent
Erismann et al.

(10) Patent No.: US 7,045,079 B2
(45) Date of Patent: May 16, 2006

(54) AQUEOUS INTUMESCENT FIRE BARRIER COMPOSITION

(75) Inventors: David Walter Erismann, Newport, MN (US); George F. Vesley, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 1155 days.

(21) Appl. No.: 09/803,039

(22) Filed: Mar. 9, 2001

(65) Prior Publication Data

US 2002/0171068 A1 Nov. 21, 2002

(51) Int. Cl.
C09K 21/02 (2006.01)
C09K 21/06 (2006.01)
C09K 21/14 (2006.01)

(52) U.S. Cl. ...................... 252/606; 523/179
(58) Field of Classification Search ............... 252/606
See application file for complete search history.

(56) References Cited

U.S. PATENT DOCUMENTS

| | | | | |
|---|---|---|---|---|
| 3,916,057 A | 10/1975 | Hatch et al. | ................. | 428/236 |
| 4,189,619 A | 2/1980 | Pedlow | ................. | 174/48 |
| 4,218,502 A | 8/1980 | Graham et al. | ................. | 428/144 |
| 4,229,329 A | 10/1980 | Bennett | ................. | 260/17 |
| 4,234,639 A | 11/1980 | Graham | ................. | 428/144 |
| 4,273,879 A | 6/1981 | Langer et al. | ................. | 521/91 |
| 4,380,593 A * | 4/1983 | von Bonin et al. | ......... | 521/163 |
| 4,434,200 A | 2/1984 | Fash et al. | ................. | 428/257 |
| 4,521,333 A | 6/1985 | Graham et al. | ............. | 252/606 |
| 4,666,960 A | 5/1987 | Spain | ................. | 523/179 |
| 4,952,615 A | 8/1990 | Welna | ................. | 523/179 |
| 5,175,197 A | 12/1992 | Gestner et al. | ............. | 523/218 |
| 5,225,464 A | 7/1993 | Hill, Jr. | | |
| 5,578,671 A | 11/1996 | Welna | ................. | 524/443 |
| 5,622,708 A | 4/1997 | Richter et al. | ............. | 424/405 |
| 5,830,319 A | 11/1998 | Landin | ................. | 162/159 |
| 5,834,535 A * | 11/1998 | Abu-Isa et al. | ............. | 523/179 |
| 5,869,164 A | 2/1999 | Nickerson et al. | ........... | 428/76 |
| 6,001,285 A | 12/1999 | Wunram | ................. | 252/606 |
| 6,010,565 A | 1/2000 | Bastian et al. | ............. | 106/122 |
| 6,084,008 A * | 7/2000 | Liu | ................. | 523/179 |
| 6,153,674 A * | 11/2000 | Landin | ................. | 524/35 |
| 6,747,074 B1 * | 6/2004 | Buckingham et al. | ...... | 523/179 |

FOREIGN PATENT DOCUMENTS

| | | |
|---|---|---|
| EP | 0 835 900 A2 | 4/1998 |
| WO | WO 88/05804 | 8/1988 |
| WO | WO 00/58419 | 10/2000 |

OTHER PUBLICATIONS

"3M Fire Barrier CP 25WB+ Caulk," product literature (4 pages) (2000).
Material Safety Data Sheet for 3M Fire Barrier CP 25WB+ Caulk (6 pages), (Nov. 2, 2000).

* cited by examiner

Primary Examiner—Joseph D. Anthony
(74) Attorney, Agent, or Firm—David B. Patchett

(57) ABSTRACT

An aqueous fire barrier composition including a latex that includes a polymer, a polyol having 2, 3 or 4 hydroxy groups and a molecular weight of from about 75 to about 1200, and an intumescent agent.

46 Claims, No Drawings

AQUEOUS INTUMESCENT FIRE BARRIER COMPOSITION

BACKGROUND OF THE INVENTION

The invention relates to aqueous intumescent fire barrier compositions.

Fire barrier materials are used to reduce or eliminate the passage of smoke, flames and fumes through openings between walls and floors. The openings in floors, walls and ceilings that conduits, piping and cables pass through are known as "through-penetrations." A through-penetration can offer low resistance to smoke, flames and fumes if not protected by fire resistant materials. These through-penetrations are often filled and blocked with fire retardant and intumescent compositions such as putties, caulks, wraps, whets and mats to provide what is often referred to as a "firestop" or a "fire barrier."

Intumescent compositions prevent a fire from penetrating through voids by expanding into the void when exposed to the heat of a fire. These compositions often form a strong char when heated. The char formed is often resistant to erosion due to the heat and pressures encountered during a fire, such as the pressures exerted by the water sprayed from fire hoses.

SUMMARY

In one aspect, the invention features an aqueous fire barrier composition that includes latex including a polymer, a polyol having 2, 3 or 4 hydroxy groups and a molecular weight of from about 75 to about 1,200, and an intumescent agent. In one embodiment, the polyol is selected from the group consisting of polyethylene glycol, polypropylene glycol and combinations thereof. In another embodiment, the composition includes from about 1% by weight to about 10% by weight polyol. In other embodiments, the composition includes from about 1% by weight to about 5% by weight polyol. In some embodiments, the composition includes from about 1% by weight to about 3% by weight polyol.

In one embodiment, the polymer is selected from the group consisting of acrylate, methacrylate, vinyl acetate and combinations thereof. In some embodiments, the polymer includes acrylate-vinylacetate-ethylene terpolymer. In other embodiments, the polymer is selected from the group consisting of rubber, styrene butadiene copolymer, butadiene acrylonitrile copolymer, polyisoprene, polybutadiene and combinations thereof.

In another embodiment, the composition has a caulk rate of at least about 100 g/min at room temperature. In some embodiments, the composition has a caulk rate of at least about 150 g/min at room temperature. In other embodiments, the composition after aging for two weeks at room temperature has a caulk rate of at least about 200 g/min. In one embodiment, the composition after aging for two weeks at 50° C. has a caulk rate of at least about 20 g/min.

In one embodiment, the composition exhibits a slump resistance of no greater than 8 mm. In other embodiments, the composition passes the one hour fire test. In some embodiments, the composition passes the two hour fire test. In other embodiments, the composition passes the three hour fire test.

In some embodiments, the composition further includes a fire retardant agent. In one embodiment, the fire retardant agent is selected from the group consisting of phosphorous, glass, boron, metal oxide, metal hydrate, and combinations thereof. In other embodiments, the fire retardant agent is selected from the group consisting of aluminum oxide trihydrate, zinc borate and mixtures thereof. In another embodiment, the intumescent agent includes a composition that includes granular alkali metal silicate represented by the formula $M_2O:XSiO_2$ in which M is an alkali metal, at least one oxyboron compound selected from the group consisting of boric acid and borate salts of Group I and group II elements, and water bound to said alkali metal silicate, the weight ratio X ranging from about 1.5 to about 4, the molar ratio of boron to M being from about 0.2 to about 0.9, and the water being from about 5% to about 15% of the total granule weight.

In other embodiments, the composition includes from about 25% by weight to about 75% by weight latex, from about 1% by weight to about 10% by weight polyol, and from about 2% by weight to about 40% by weight intumescent agent.

In another aspect, the aqueous fire barrier composition includes latex including a polymer, polyol having 2, 3 or 4 hydroxy groups and an intumescent agent that includes a composition including granular alkali metal silicate represented by the formula $M_2O:XSiO_2$ in which M is an alkali metal, at least one oxyboron compound selected from the group consisting of boric acid and borate salts of Group I and group II elements, and water bound to said alkali metal silicate, the weight ratio X ranging from about 1.5 to about 4, the molar ratio of boron to M being from about 0.2 to about 0.9, and the water being from about 5% to about 15% of the total granule weight. In one embodiment, the polyol is selected from the group consisting of ethylene glycol, propylene glycol, polyethylene glycol, polypropylene glycol, glycerol and combinations thereof. In some embodiments, the composition includes from about 1% by weight to about 10% by weight polyol. In other embodiments, the composition includes from about 1% by weight to about 5% by weight polyol. In other embodiments, the composition includes from about 1% by weight to about 3% by weight polyol.

In one embodiment, the polymer includes acrylate-vinylacetate-ethylene terpolymer.

In another aspect, the invention features an aqueous fire-barrier composition that includes latex including acrylate-vinylacetate-ethylene terpolymer, polyol having 2, 3 or 4 hydroxy groups, and an intumescent agent.

In one embodiment, the aqueous fire barrier composition includes a) 40% by weight to 45% by weight latex comprising acrylate-vinylacetate-ethylene terpolymer, b) 1% by weight to 3% by weight polyethylene glycol having a molecular weight from about 100 to about 500, c) 15% by weight to 25% by weight intumescent agent including a composition that includes granular alkali metal silicate represented by the formula $M_2O:XSiO_2$ in which M is an alkali metal, at least one oxyboron compound selected from the group consisting of boric acid and borate salts of Group I and group II elements, and water bound to said alkali metal silicate, the weight ratio X ranging from about 1.5 to about 4, the molar ratio of boron to M being from about 0.2 to about 0.9, and the water being about 5% to about 15% of the total granule weight, and d) 18% by weight to 27% by weight zinc borate.

The composition can be employed to prevent fire from penetrating through voids filled with the composition. Surprisingly, the inventors have found that the composition has a good shelf life and exhibits a good caulk rate after aging.

Other features and advantages of the invention will be apparent from the following description of the preferred embodiments thereof, and from the claims.

DETAILED DESCRIPTION

The aqueous fire barrier composition is caulkable, i.e., can be applied using a caulk gun, and is capable of intumescing, i.e., expanding, when exposed to temperatures of at least about 200° C. As the composition intumesces it seals voids in through-penetrations, which can prevent the passage of flame, smoke, fumes and water from one location to another. As the composition is heated further it begins to char, which further enhances the composition's fire barrier properties. The composition can form a char that is resistant to the erosive effects of a high pressure stream of water such as those encountered during a fire fighting effort. Preferred compositions pass the Fire Tests set forth in the Examples section below.

The aqueous fire barrier composition exhibits an initial caulk rate of at least about 100 g/min, preferably at least about 150 g/min, more preferably at least about 200 g/min, most preferably at least about 300 g/min. The composition also is caulkable after aging for a period of time at room temperature. The composition preferably has a caulk rate of at least about 20 g/min, preferably at least about 50 g/min, more preferably at least about 80 g/min, most preferably at least about 100 g/min after aging for two weeks at room temperature, preferably after aging for two weeks at 50° C.

The composition preferably maintains its shape, i.e., does not sag, when applied to a vertical substrate. One measure of the compositions ability to maintain its shape on a vertical substrate is slump. Preferably the composition exhibits a slump of no greater than 8 mm. A thickener can be added to the composition to prevent sagging.

The aqueous fire barrier composition includes polymer latex, a polyol and an intumescent agent. The latex includes water and polymer. Suitable latex polymers include halogenated (e.g., polychloroprene) and non-halogenated polymers. Preferably the latex polymer is non-halogenated. Examples of useful non-halogenated polymers include acrylates, methacrylates, vinyl acetates and combinations thereof including e.g., blends, copolymers and terpolymers thereof including, e.g., ethylene/vinyl acetate/acrylate terpolymer. Other useful non-halogenated polymers include natural rubbers, styrene butadiene copolymers, butadiene acrylonitrile copolymers, polyisoprene and polybutadiene and combinations thereof including, e.g., blends and copolymers thereof. Examples of suitable commercially available latices include acrylate polymer latex available under the trade designation RHOPLEX HA-8 from Rohm and Haas Co. (Philadelphia, Pa.) and ethylene/vinyl acetate/acrylate terpolymer commercially available under the trade designations FLEXBOND 149 and AIRFLEX 600 BP from Air Products and Chemicals (Allentown, Pa.). Preferably the latex composition includes from about 30% by weight to about 75% by weight polymer.

The latex can also include other additives including, e.g., hydrochloric acid scavenger (e.g., zinc oxide), surfactants, dispersants, defoamers and antioxidants.

The amount of latex present in the fire barrier composition is preferably from about 25% by weight to about 75% by weight.

Useful polyols include compounds containing 2, 3 or 4 hydroxy groups including, e.g., ethylene glycol, propylene glycol, tripropylene glycol, polyethylene glycol, polypropylene glycol, glycerol and combinations thereof. Preferably the polyol is liquid below 30° C. and is miscible with water. Preferred polyols have a molecular weight of from about 75 to about 1,200, more preferably from about 100 to about 500.

The amount of polyol present in the composition is preferably sufficient to provide a composition having the desired initial caulk rate and that maintains a suitable caulk rate over time. Suitable compositions include polyol in an amount of at least about 1% by weight, more preferably from about 1% by weight to about 10% by weight, more preferably from about 1% by weight to about 5% by weight, more preferably from about 1% by weight to about 3% by weight, most preferably from about 2% by weight to about 3% by weight.

Suitable intumescent agents include, e.g., hydrated alkali metal silicates (e.g., sodium silicate, lithium silicate and potassium silicate with bound water), expandable graphite, unexpanded vermiculite, melamine (i.e., 2,4,6-triamino-1,3, 5-triazine), azocarbonamide and benzene sulfonyl hydrazide. Other suitable silicate intumescent agents are disclosed, e.g., in U.S. Pat. No. 4,521,333, and incorporated herein.

A preferred intumescent agent includes a granular hydrated alkali metal silicate intumescent composition that includes a mixture of bound water, at least one alkali metal silicate having the formula $M_2O:XSiO_2$, where M is an alkali metal (e.g., sodium, lithium and potassium) and the weight ratio X ranges from about 1.5 to about 4, and at least one oxyboron compound. Suitable oxyboron compounds include, e.g., boric acid and borate salts of Group I and Group II elements including, e.g., metaborate, tetraborate, perborate, polyborate radicals, boric acid, colemanite, calcium metaborate, magnesium borate, zinc borate and mixtures thereof. Preferably the molar ratio of boron (present in the oxyboron compound) to M is from about 0.2 to about 0.9. The water is present in the composition in an amount of from about 5 to about 15% by weight of the mixture of water, oxyboron compound and alkali metal silicate.

The fire barrier composition preferably includes intumescent agent in an amount of from about 2% by weight to about 40% by weight, more preferably from about 15% by weight to about 30% by weight, most preferably from about 15% by weight to about 25% by weight.

The fire barrier composition also preferably includes a fire retardant agent. Preferably the fire retardant agent is endothermic. Examples of suitable fire retardant agents include boron compounds (e.g., boric oxide and zinc borate), metal hydrates (e.g., alumina trihydrate), phosphorous compounds including, e.g., nitrogen phosphates (e.g., ethylene diamine phosphate), dimelamine phosphate, melamine phosphate and ammonium polyphosphate, mixtures of bismelaminium pentate and polyhedric oxide, glass frit compounds, metal oxides, and combinations thereof.

Suitable commercially available fire retardant agents are available under the trade designations AMGUARD EDAP ethylene diamine phosphate, AMGUARD ND dimelamine phosphate and AMGUARD NH melamine phosphate from Allright & Wilson Ltd (Richmond, Va.), PHOS CHEK P30 and PHOS CHECK P40 ammonium polyphosphate from Monsanto (St. Louis, Mo.), CHAR GUARD 329 blend of melaminium pentate and polyhedric oxide from Great Lakes Chemical Corp. (West Lafayette, Ind.). The composition preferably includes from about 3% by weight to about 35% by weight fire retardant, more preferably from about 20% by weight to about 27% by weight.

Thickeners can be included in the composition to alter the Theological properties of the composition. Examples of suitable thickeners include cellulosic thickeners, e.g., hydroxyethyl cellulose, hydroxy propylmethyl cellulose and carboxymethyl cellulose, fumed silica, carbonates, clays, urethanes, and combinations thereof. The thickener can be present in the fire barrier composition in an amount no greater than about 40% by weight.

The composition can also include other additives, e.g., pigments, char forming agents (e.g., char forming resins), reinforcing fillers such as glass fibers, defoamers, plasticizers, dispersants and combinations thereof.

Useful char forming polymers include, e.g., vinyl acetates, acrylates, methacrylates, and combinations thereof including blends, copolymers and terpolymers thereof (e.g., ethylene/vinyl acetate/acrylate), epoxy resins, phenolic resins (including, e.g., phenol-formaldehyde resins), polycarboimide resins, urea-formaldehyde resins, melamine-formaldehyde resins and combinations thereof. The fire barrier composition preferably includes no greater than about 75% by weight char forming resin.

All parts, ratios, percentages and amounts stated in the Examples are by weight unless otherwise specified.

EXAMPLES

Test Procedures

Test procedures used in the examples include the following.

Caulk Rate Test Method

The caulk rate of a composition is measured as the rate of flow (grams/minute (g/min)) of the composition through 1⅝ in. diameter, 6.5 in. long standard polyethylene tube obtained from Semco Plastic Co., Glendale Calif. (#250-C6, 6 oz.) under a constant applied pressure of 50 psi. The end of the tube is equipped with a 4¼ in. long tapered spout. The diameter is ¹¹⁄₁₆ in. at the spout entrance and ⅛ in. at the spout exit.

The caulk is loaded into the tube with a spatula. Care is taken to tightly pack the caulk in the tube preventing any air pockets. A plunger is then inserted into the back end of the tube and the tube is placed in a Semco Caulk gun. The air pressure is adjusted to 50 psi and several inches of caulk are extruded from the tube. The caulk is then extruded at room temperature (about 25° C.) from the tube into a tared paper cup for 5 seconds under 50 psi of pressure. The weight of the extruded caulk is measured and the caulk flow rate is calculated in g/min.

Slump Resistance Test Method

Slump resistance is determined using ASTM Test Method No. D2202 entitled, "Standard Test Method for Slump of Sealants," modified such that the cavity in the block is 2.5 in. in diameter and 1 in. deep. The test is run at room temperature and the results are reported in mm.

Fire Test Methods

One Hour Fire Test

The one hour fire test is conducted according to ASTM E814 entitled, "Standard Test Method for Fire Tests of Through-Penetration Fire Stops." Type M copper pipes, 6 in. in diameter, are mounted with point contact in nominal 8 in. diameter openings in 2.5 in. thick concrete slabs such that the annular space varies from point contact to 1⅞ in. The concrete slabs simulate concrete floors. The copper tubes are fire stopped with a 2 in. depth of tightly packed 4 lb/ft³ mineral wool. The annular space is packed, from the side of the assembly that is not exposed to fire (i.e., the "unexposed side"), with 2 in. of mineral wool. The sample fire barrier composition is inserted into the unexposed side of the mineral wool packed annular opening to a depth of ½ in. and smeared around the copper pipe and concrete slab so as to completely seal the opening. The assembly is allowed to age at room temperatures for 30 days before testing to allow the moisture content to equilibrate. The assembled concrete slab is horizontally mounted onto a gas-fired furnace heated per ASTM E814. The exposed side of the test assembly is then burned for one hour.

The sample fire barrier composition is considered to have passed the test if there is no passage of flame through the caulked opening to the unexposed side of the test assembly during the fire test.

Two Hour Fire Test

The two hour fire test is conducted as described in the one hour fire test with the exception that the composition is inserted into the annual opening to a depth of ¼ in. instead of ½ in. and the concrete slab test assembly is placed in the gas-fired furnace for a period of two hours.

The sample fire barrier composition is considered to have passed the test if there is no passage of flame through the caulked opening to the unexposed side of the test assembly during the fire test.

Three Hour Fire Test

The three hour fire test is conducted as described in the one hour fire test with the exception that the concrete slab has a depth of 4.5 in. and the assembly is placed in the gas-fired furnace for a period of three hours.

The sample fire barrier composition is considered to have passed the test if there is no passage of flame through the caulked opening to the unexposed side of the test assembly during the fire test.

Hose Stream Test Method

Immediately after the stated burn time of the Fire Test Method, the concrete slab assembly is removed from the furnace. The assembly is then positioned vertically and the exposed side is subjected to a stream of water from a fire hose at a pressure of 30 psi from a distance of 20 feet and for the period set forth in ASTM E814.

The sample fire barrier composition is considered to have passed the test if the fire barrier composition does not develop an opening that allows the water to penetrate to the unexposed side of the test assembly during the fire hose stream test.

Example 1

An intumescent caulk was prepared by combining 42.49 parts Airflex 600 BP 55% solids acrylate-vinylacetate-ethylene terpolymer latex (Air Products and Chemicals, Allentown, Pa.), 0.91 parts Triton X-100 70% solids alkylphenyl polyether alcohol (Union Carbide, Charleston, W.Va.), 0.91 parts Tamol 850 30% solids sodium salt of a polymeric carboxylic acid (Rohm & Hass, Philadelphia, Pa.), 5.7 parts Santicizer 141 2-ethylhexyl diphenyl phosphate (Monsanto, St. Louis, Mo.) and 2.3 parts BF-1 iron oxide pigment (Bailey Engineers, Fairfield, Ala.) in a Hobart mixer (Hobart Corp., Troy, Ohio). This mixture was thoroughly mixed and each of the following components were slowly and sequentially added and thoroughly mixed: 19.36 parts Expantrol 4BW hydrated sodium silicate granules containing oxyboron compound (Minnesota Mining and Manufacturing Company, St. Paul, Minn.), 22.84 parts FireBrake ZB Regular zinc borate $2ZnO*3B_2O_3*3.5H_2O$ (U.S. Borax, Valencia, Calif.), 2 parts Carbowax 300 polyethylene glycol having a molecular weight of 300 (Union Carbide), 1.42 parts 80% fiber wet-chopped 7.5 micron diameter ⅛ in fiberglass (Owens-Corning, Corning, N.Y.), 0.69 parts Cab-O-Sil M5 amorphous fumed silica (Cabot Corporation Tuscola. Ill.) and 0.12 parts Foamaster 111 defoamer (Henkel Chemicals, Ambler, Pa.). All in parts by weight.

After all components were combined, the composition was mixed at high speed for an additional 5 minutes to form a homogenous mixture that was caulkable. The caulk rate of the composition was measured within several days of mixing and in intervals up to 50 weeks. The caulk rate of the composition after aging for 5 weeks at room temperature was 190 g/min and the caulk rate after aging for 50 weeks at room temperature was 22 g/min. The slump before and after aging was less than 2.5 mm. The formulation passed the 1, 2 and 3 hour Fire Tests. The assemblies used in the 1, 2 and 3 hour fire tests also passed the Hose Stream Test. These results are reported in Table 1.

TABLE 1

| Example | Polyol | Slump (mm) | Caulk Rate after 5 weeks Room Temp (g/min) | Caulk Rate after 50 weeks Room Temp (g/min) | Fire Test 1[a] | Fire Test 2[a] | Fire Test 3[a] | Hose Stream Test 1[a] | Hose Stream Test 2[a] | Hose Stream Test 3[a] |
|---|---|---|---|---|---|---|---|---|---|---|
| 1 | polyethylene glycol | <2.5 | 199 | 22 | P | P | P | P | P | P |

[a] = hours of burn time.

Example 2

A composition was prepared exactly as described in Example 1. The initial caulk rate was 311 g/min and the caulk rate after aging for two weeks at 50° C. was 84 g/min. The slump before and after aging was less than 2.5 mm.

Example 3

A composition was prepared exactly as described in Example 1 with the exception that 2% by weight of propylene glycol was added in place of the Carbowax 300. The initial caulk rate was 374 g/min. The caulk rate of the composition after aging for two weeks at 50° C. was 77 g/min. The slump before and after aging was less than 2.5 mm.

Example 4

A composition was prepared exactly as described in Example 1 with the exception that 2% by weight tripropylene glycol was added in place of the Carbowax 300. The initial caulk rate was 266 g/min. The caulk rate after aging for two weeks at 50° C. was 29 g/min. The slump before and after aging was less than 2.5 mm.

Example 5

A composition was prepared exactly as described in Example 1 with the exception that 2% by weight glycerol was added in place of the Carbowax 300. The initial caulk rate was 482 g/min. The caulk rate after aging for two weeks at 50° C. was 84 g/min. The slump before and after aging was less than 2.5 mm.

The results for Examples 2–5 are reported in Table 2.

TABLE 2

| Example | Polyol | Slump (mm) | Initial Caulk Rate (g/min) | Caulk Rate after 2 weeks at 50° C. (g/min) |
|---|---|---|---|---|
| 2 | polyethylene glycol | <2.5 | 311 | 84 |
| 3 | propylene glycol | <2.5 | 374 | 77 |
| 4 | tripropylene | <2.5 | 266 | 29 |
| 5 | glycerol | <2.5 | 482 | 84 |

Other embodiments are within the claims.

What is claimed is:

1. An aqueous fire barrier composition comprising:
   latex comprising a polymer;
   from 1% by weight to about 10% by weight polyol having 2, 3 or 4 hydroxy groups and a molecular weight of from 100 to about 1,200, said polyol being selected from the group consisting of polyethylene glycol, polypropylene glycol, and combinations thereof; and
   an intumescent agent.

2. The composition of claim 1, wherein said composition comprises from about 1% by weight to about 5% by weight polyol.

3. The composition of claim 1, wherein said composition comprises from about 1% by weight to about 3% by weight polyol.

4. The composition of claim 1, wherein said polymer is selected from the group consisting of acrylate, methacrylate, vinyl acetate and combinations thereof.

5. The composition of claim 1, wherein said polymer comprises acrylate-vinylacetate-ethylene terpolymer.

6. The composition of claim 1, wherein said polymer is selected from the group consisting of rubber, styrene butadiene copolymer, butadiene acrylonitrile copolymer, polyisoprene, polybutadiene and combinations thereof.

7. The composition of claim 1, wherein said composition has a caulk rate of at least about 100 g/min at room temperature.

8. The composition of claim 1, wherein said composition has a caulk rate of at least about 150 g/min at room temperature.

9. The composition of claim 1, wherein said composition after aging for two weeks at room temperature has a caulk rate of at least about 200 g/min.

10. The composition of claim 1, wherein said composition after aging for two weeks at 50° C. has a caulk rate of at least about 20 g/min.

11. The composition of claim 1, wherein said composition exhibits a slump resistance of no greater than 8 mm.

12. The composition of claim 1, wherein said composition passes the One Hour Fire Test.

13. The composition of claim 1, wherein said composition passes the Two Hour Fire Test.

14. The composition of claim 1, wherein said composition passes the Three Hour Fire Test.

15. The composition of claim 1, wherein said composition passes the Hose Stream Test after a one hour burn.

16. The composition of claim 1, wherein said composition passes the Hose Stream Test after a two hour burn.

17. The composition of claim 1, wherein said composition passes the Hose Stream Test after a three hour burn.

18. The composition of claim 1, further comprising a fire retardant agent.

19. The composition of claim 18, wherein said fire retardant agent is selected from the group consisting of phosphorous, glass, boron, metal oxide, metal hydrate, and combinations thereof.

20. The composition of claim 18, wherein said fire retardant agent is selected from the group consisting of aluminum oxide trihydrate, zinc borate and mixtures thereof.

21. The composition of claim 1, wherein said polyol has a molecular weight of from about 100 to about 500.

22. The composition of claim 1, wherein said intumescent agent comprises a composition comprising
granular alkali metal silicate represented by the formula $M_2O:XSiO_2$ in which M is an alkali metal,
at least one oxyboron compound selected from the group consisting of boric acid and borate salts of Group I and Group II elements, and
water bound to said alkali metal silicate,
the weight ratio X ranging from about 1.5 to about 4,
the molar ratio of boron to M being from about 0.2 to about 0.9,
and the water being from about 5% to about 15% of the total granule weight.

23. The composition of claim 1 comprising:
from about 25% by weight to about 75% by weight latex;
from about 1% by weight to about 10% by weight polyol; and
from about 2% by weight to about 40% by weight intumescent agent.

24. An aqueous fire barrier composition comprising:
latex comprising a polymer;
from 1% by weight to about 10% by weight polyol having 2, 3 or 4 hydroxy groups, said polyol being selected from the group consisting of ethylene glycol, polypropylene glycol, glycerol, and combinations thereof; and
an intumescent agent comprising a composition comprising
granular alkali metal silicate represented by the formula $M_2O:XSiO_2$ in which M is an alkali metal,
at least one oxyboron compound selected from the group consisting of boric acid and borate salts of Group I and Group II elements, and
water bound to said alkali metal silicate,
the weight ratio X ranging from about 1.5 to about 4,
the molar ratio of boron to M being from about 0.2 to about 0.9,
and the water being about 5% to about 15% of the total granule weight.

25. The composition of claim 24, wherein said composition comprises from about 1% by weight to about 5% by weight polyol.

26. The composition of claim 24, wherein said composition comprises from about 1% by weight to about 3% by weight polyol.

27. The composition of claim 24, wherein said polymer comprises acrylate-vinylacetate-ethylene terpolymer.

28. The composition of claim 24, further comprising a fire retardant agent.

29. The composition of claim 28, wherein said fire retardant compound is selected from the group consisting of phosphorous, glass, boron, metal oxide, metal hydrate, and combinations thereof.

30. The composition of claim 28, wherein said fire retardant agent is endothermic.

31. The composition of claim 28, wherein said fire retardant agent is selected from the group consisting of aluminum oxide trihydrate, zinc borate and mixtures thereof.

32. The composition of claim 24, wherein said composition exhibits a caulk rate of at least about 100 g/min at room temperature.

33. The composition of claim 24, wherein said composition exhibits a caulk rate of at least about 150 g/min at room temperature.

34. The composition of claim 24, wherein said composition after aging for two weeks at room temperature exhibits a caulk rate of at least about 200 g/min.

35. The composition of claim 24, wherein said composition after aging for two weeks at 50° C. has a caulk rate of at least about 20 g/min.

36. The composition of claim 24, wherein said composition exhibits a slump resistance of no greater than 8 mm.

37. The composition of claim 24, wherein said composition passes the One Hour Fire Test.

38. The composition of claim 24, wherein said composition passes the Two Hour Fire Test.

39. The composition of claim 24, wherein said composition passes the Three Hour Fire Test.

40. The composition of claim 24, wherein said composition passes the Hose Stream Test after a one hour burn.

41. The composition of claim 24, wherein said composition passes the Hose Stream Test after a two hour burn.

42. The composition of claim 24, wherein said composition passes the Hose Stream Test after a three hour burn.

43. The composition of claim 24, wherein said polymer is selected from the group consisting of acrylate, methacrylate, vinyl acetate and combinations thereof.

44. The composition of claim 24, wherein said polymer comprises acrylate-vinylacetate-ethylene terpolymer.

45. The composition of claim 24, wherein said polymer is selected from the group consisting of rubber, styrene butadiene copolymer, butadiene acrylonitrile copolymer, polyisoprene, polybutadiene and combinations thereof.

46. An aqueous fire barrier composition comprising:
a) 40% by weight to 45% by weight latex comprising acrylate-vinylacetate-ethylene terpolymer;
b) 1% by weight to 3% by weight polyethylene glycol having a molecular weight from about 100 to about 500;
c) 15% by weight to 25% by weight intumescent agent comprising a composition comprising
granular alkali metal silicate represented by the formula $M_2O:XSiO_2$ in which M is an alkali metal,
at least one oxyboron compound selected from the group consisting of boric acid and borate salts of Group I and Group II elements, and
water bound to said alkali metal silicate,
the weight ratio X ranging from about 1.5 to about 4,
the molar ratio of boron to M being from about 0.2 to about 0.9,
and the water being about 5% to about 15% of the total granule weight; and
d) 18% by weight to 27% by weight zinc borate.

* * * * *